(12) United States Patent
Lee

(10) Patent No.: US 6,772,242 B2
(45) Date of Patent: Aug. 3, 2004

(54) COMMUNICATION DEVICE USING THREE-STEP COMMUNICATION BUFFERS

(75) Inventor: Young-Joon Lee, Anyang (KR)

(73) Assignee: LG Industrial Systems Co., Ltd., Seoul (KR)

(*) Notice: Subject to any disclaimer, the term of this patent is extended or adjusted under 35 U.S.C. 154(b) by 0 days.

(21) Appl. No.: 10/370,729

(22) Filed: Feb. 24, 2003

(65) Prior Publication Data

US 2003/0163607 A1 Aug. 28, 2003

(30) Foreign Application Priority Data

Feb. 26, 2002 (KR) .......................................... 2002-10303

(51) Int. Cl.⁷ ............................................. G06F 13/14
(52) U.S. Cl. ..................... 710/52; 710/53; 711/153; 709/213; 709/214; 709/215; 709/237; 709/238
(58) Field of Search ................... 710/52, 53; 711/153; 709/213, 214, 215, 237, 238

(56) References Cited

U.S. PATENT DOCUMENTS

| | | | | |
|---|---|---|---|---|
| 4,833,655 A | * | 5/1989 | Wolf et al. | ................ 365/221 |
| 5,245,553 A | * | 9/1993 | Tanenbaum | ................ 709/237 |
| 5,515,007 A | * | 5/1996 | Moraveji | .................... 330/263 |
| 5,699,529 A | * | 12/1997 | Powell et al. | ................. 710/53 |

\* cited by examiner

*Primary Examiner*—Rehana Perveen
(74) *Attorney, Agent, or Firm*—Greenblum & Bernstein, P.L.C.

(57) ABSTRACT

The present invention relates to a communication device using three-step communication buffers which temporarily stores received data or data to be transmitted between a serial communication device and a central processing unit. To prevent an error resulted from that the serial communication device and the central processing unit simultaneously access to the communication buffer, the access to the communication buffer is allowed at different edges of the system clock signal, thereby having a time difference of the access.

8 Claims, 3 Drawing Sheets

COMMUNICATION DEVICE USING THREE-STEP COMMUNICATION BUFFERS

BACKGROUND OF THE INVENTION

1. Field of the Invention

The present invention relates to a communication device using three-step communication buffers and a data transmitting/receiving device, and more particularly, to a communication device using three-step communication buffers in which a serial communication device and a central processing unit can be always accessible to the three-step communication buffers.

2. Description of the Background Art

Generally, a large-scale integration circuit chip for communication and a circuit board for communication used in a serial communication terminal apparatus have a serial communication device (e.g. universal asynchronous receiver/transmitter, abbreviated UART) and a communication buffer for temporarily storing data therein. At this time, the communication buffer is provided to be accessible from two peripheral devices. The peripheral devices includes a serial communication device for transmitting and receiving data to/from an external device through a communication line, and a central processing unit for receiving data from the serial communication device or processing data to be transmitted through the serial communication device.

The transmitting/receiving device and the central processing unit use a communication buffer asynchronously, thereby accessing to the communication buffer at the same time. However, there is a disadvantage that incomplete data are accessed to cause an error to read and write unintended data.

The errors will be explained as follows in detail.

FIGS. 1A and 1B are diagrams showing problems of the communication device using one communication buffer according to a related art, in which FIG. 1A shows a case that synchronization of data is broken and FIG. 1B shows a case that incomplete data reading is generated.

FIG. 1A shows a case that the serial communication device 100 and the central processing unit 200 write data in one communication buffer 300. At this time, the writing and the reading have a special direction. That is, the central processing unit 200 stores data from an upper layer of the communication buffer 300 to a lower layer, and the serial communication device 100 sequentially reads the data from the upper layer of the communication buffer 300 to the lower layer and thereby transmitting the data to an external device (not shown).

However, in this process, in case that the serial communication device 100 reads data to be transmitted in a state that the central processing unit 200 does not complete to write the data or the central processing unit 200 reads data previously stored in the communication buffer 30 before the serial communication device 100 stores newly received data in the communication buffer 300 by a processing speed difference resulted from asynchronization of the central processing unit 200 and the serial communication device 100, data are not updated, that is, data do not have synchronism.

FIG. 1B shows a case that the same storage region of the communication buffer 300 is simultaneously accessed by the serial communication device 100 and the central processing unit 200. Herein, when the serial communication device 100 and the central processing unit 200 access to the same storage region of the communication buffer 300 at the same time, the data can be read incompletely.

Accordingly to this, in order to solve problems generated when one communication buffer is used, three-step communication buffers are used.

A communication device using three-step communication buffers according to the prior art and a method for transmitting/receiving data will be explained in detail with reference to attached drawings.

FIG. 2 is a construction view showing three-step communication buffers according to the prior art.

As shown in FIG. 2, the communication device comprises: a serial communication device 100 for transmitting/receiving data with an external device (not shown) in serial; a central processing unit 200 for processing data of an external device by accessing thereto or processing data of an inner device; three-step communication buffers BUF1, BUF2, and BUF3 respectively designated by DOUT1_BUF_PTR, DOUT2_BUF_PTR, and DOUT3_BUF_PTR for temporarily storing the data; an interrupt generator 500 for generating interrupt to the central processing unit 200; and a state buffer 400 for transmitting states of the respective communication buffers BUF1, BUF2, and BUF3 to the central processing unit 200.

A communication device using the three-step communication buffers according to the prior art and a method for transmitting/receiving data will be explained as follows.

Each of communication buffers BUF1, BUF2, and BUF3 is set to have any one state of "reading", "writing", "waiting", and "not using". The setting is stored in the state buffer 400. Then, the communication device designates the respective communication buffers BUF1, BUF2, and BUF3 with the pointers DOUT1_BUF_PTR, DOUT2_BUF_PTR, and DOUT3_BUF_PTR by using state information stored in the state buffer 400, thereby enabling to read and write.

According to this, a processing speed difference between the serial communication device 100 and the central processing unit 200 and an overlap of the processing location are not generated, thereby enabling to access to the respective communication buffers at all times.

Hereinafter, the communication device using the three-step communication buffers according to the related art and the method for transmitting/receiving data will be explained in detail.

1) A Method for Receiving Data

The serial communication device 100 selects one communication buffer BUF 1 to make into a data writing state. The communication buffer BUF1 is selected as an example, and the other communication buffers BUF 2 and BUF 3 can be also selected. The communication buffer BUF1 is designated and then received data are written in the communication buffer BUF 1.

Subsequently, when the reception of the data is completed, the serial communication device 100 changes a state of the communication buffer BUF 1 into that of a communication buffer where recent data are stored. This state information is stored in the state buffer 400.

Then, when the reception of the data is completed, the serial communication device 100 generates an interrupt to inform to the interrupt generator 500 that. The interrupt generator 500 applies the interrupt signal to the central processing unit 200. Then, the central processing unit 200 checks the state buffer 400, thereby checking in which communication buffer the recent data are stored.

If the central processing unit 200 checks the state buffer 400, the communication buffer BUF 1 where the recent data are stored is converted into a reading state. Then, the central processing unit 200 accesses to the communication buffer BUF 1 converted into the reading state to read the stored data.

Like this, since at least one communication buffer among the three communication buffers BUF1, BUF 2, and BUF 3 is not used in a process for receiving data or stores the recent data, the central processing unit 200 can access to the data at all times and an interference is not generated between the central processing unit 200 and the serial communication device 100.

2) A Method for Transmitting Data

Contrary to said receiving method, the central processing unit 200 checks a readable communication buffer by the state buffer 400, stores transmission data in the readable communication buffer BUF 3, and converts state information of the communication buffer BUF 3 into a state that data to be transmitted are stored. Then, the serial communication device 100 receives a request to transmit data from the external device, designates a state of the communication buffer BUF 3 where the data are stored into a readable state, and reads the data from the buffer BUF 3, thereby transmitting to the external device.

Like this, the communication device using the three communication buffers according to the related art can perform a stable data processing since an operation between the central processing unit 200 and the serial communication device 100 is not overlapped or interfered.

However, actually, the central processing unit 200 always reads the state buffer 400 at the time when the interference is generated or transmission data are written to check state information of the respective communication buffers, to find a communication buffer having the corresponding state, and to perform data reading or data writing, thereby having a complicated operation and a delayed time.

SUMMARY OF THE INVENTION

Therefore, an object of the present invention is to provide a communication device using three-step communication buffers which can prevent an error resulted from that a central processing unit and a serial communication device simultaneously access to three-step communication buffers at the time of reading and writing data.

Another object of the present invention is to provide a communication device using three-step communication buffers, in which a central processing unit and a serial communication device can access to each other without interference and time is not delayed by omitting to check a state of each communication buffer.

To achieve these and other advantages and in accordance with the purpose of the present invention, as embodied and broadly described herein, there is provided a communication device using three-step communication buffers comprising: a serial communication device for receiving data from another communication device or transmitting data to said another communication device; a central processing unit for reading data received from the serial communication device to process or providing the serial communication device with data to be transmitted to another communication device; an interrupt generator for generating an interrupt signal and outputting to the central processing unit when the serial communication device completes to receive the data; a system clock generator for generating a clock signal for synchronizing the communication device; a first communication buffer connected to the serial communication device for temporarily storing data received from the serial communication device or temporarily storing data to be transmitted to said another communication device from the central processing unit and for providing to the serial communication device; a third communication buffer enabled at a rising edge or a falling edge of the clock signal from the system clock generator for receiving data to temporarily store or outputting the stored data; and a second communication buffer connected between the first communication buffer and the third communication buffer and enabled at a different edge from the edge of the clock signal from the system clock generator which enables the third communication buffer for receiving data from the first communication buffer to temporarily store or outputting the stored data to the first communication buffer.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
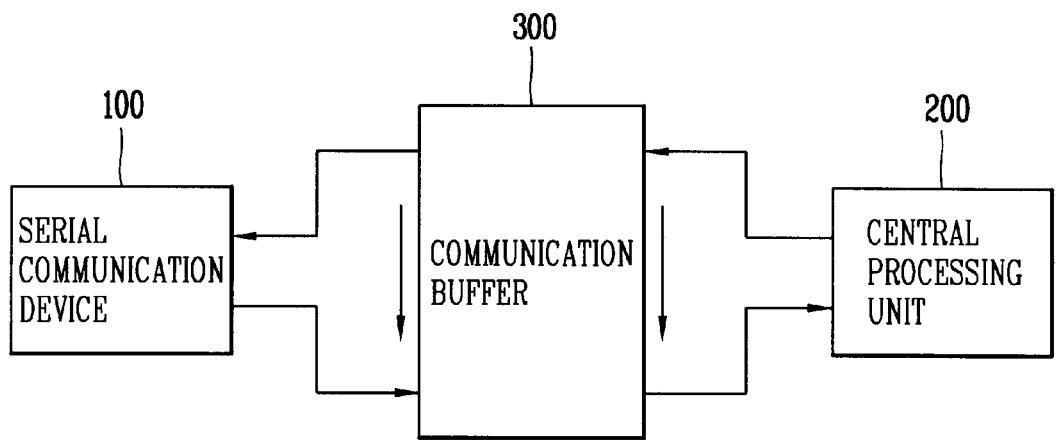
FIGS. 1A and 1B are diagrams showing problems of a communication device using one communication buffer in accordance with a related art.
Figure 1B:
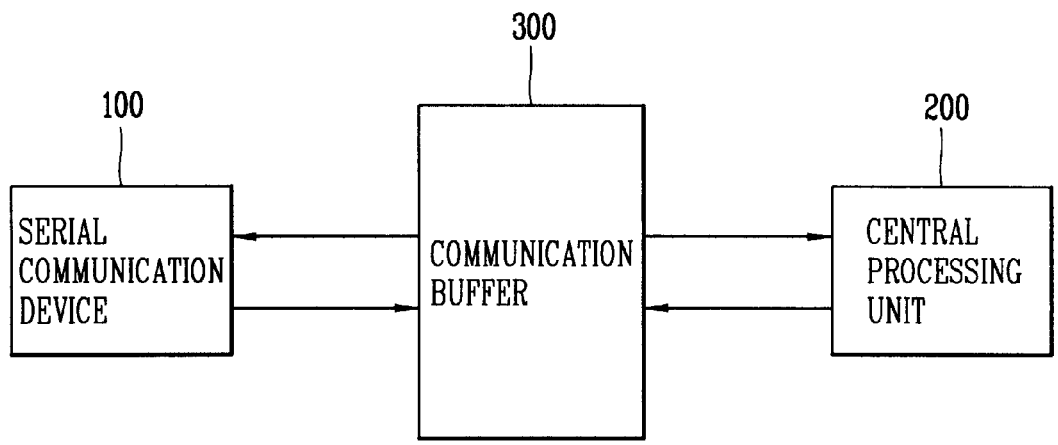
Figure 2:
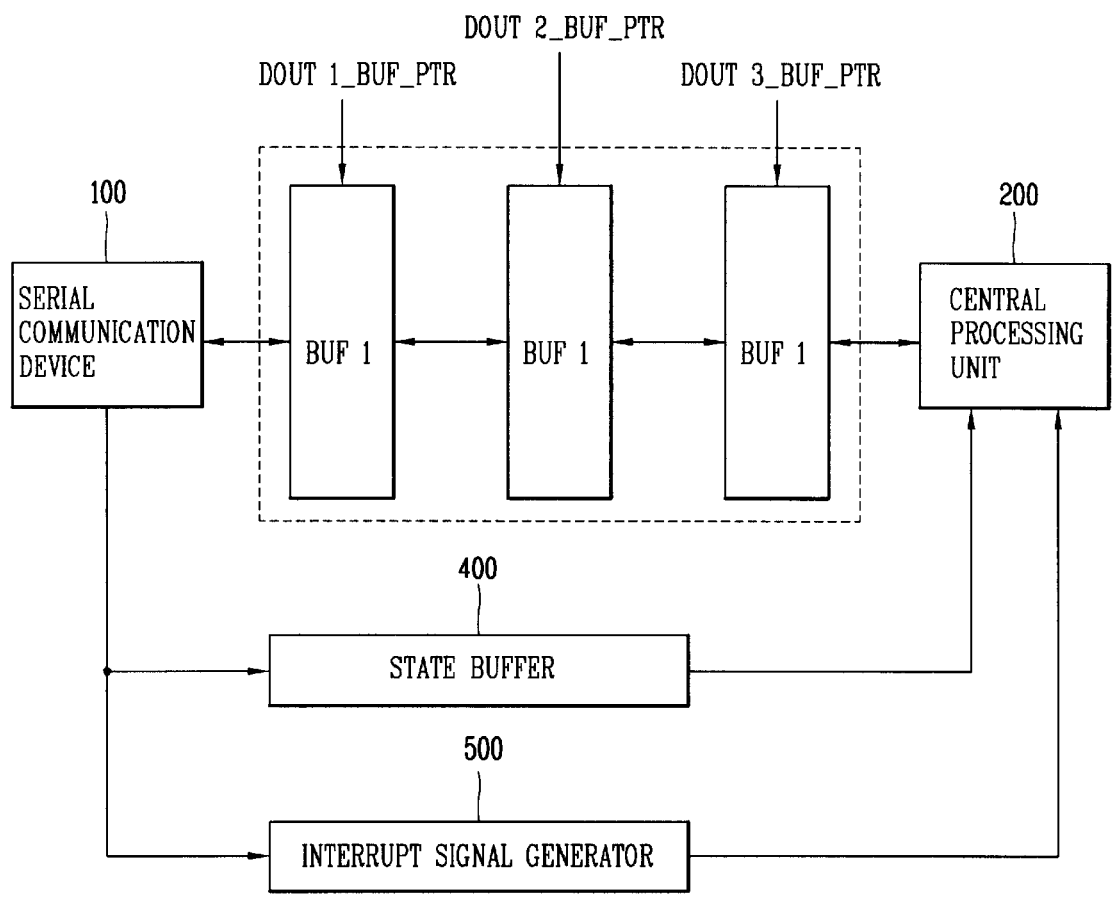
FIG. 2 is a block diagram showing a communication device using three-step communication buffers in accordance with a related art.
Figure 3:
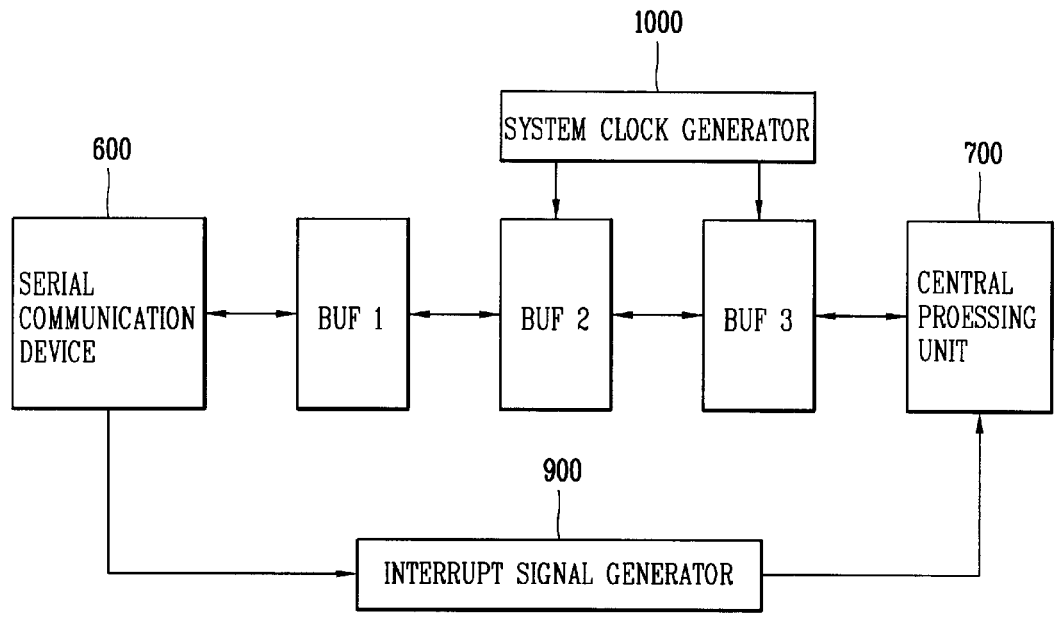
FIG. 3 is a block diagram showing a communication device using three-step communication buffers according to the one embodiment of the present invention.

FIG. 3 is a block diagram showing a communication device using three-step communication buffers according to the present invention.

As shown in FIG. 3, the communication device according to a first embodiment of the present invention comprises: a serial communication device (for example, Universal Asynchronous Receiver/Transmitter, abbreviated UART) 600 for receiving data from another communication device or transmitting data from a central processing unit to said another communication device; a central processing unit 700 for reading data received from the serial communication device to process or providing the serial communication device 600 with data to be transmitted to another communication device; an interrupt generator 900 for generating an interrupt signal and outputting to the central processing unit 700 when the serial communication device completes to receive the data; a system clock generator 1000 for generating a clock signal for synchronizing the communication device; a first communication buffer BUF 1 connected to the serial communication device 600 for temporarily storing data received from the serial communication device 600 or temporarily storing data to be transmitted to said another communication device from the central processing unit 700 and for providing to the serial communication device 600; a third communication buffer BUF 3 enabled at a rising edge or a falling edge of the clock signal from the system clock generator 1000 for receiving data to temporarily store or outputting the stored data; and a second communication buffer BUF 2 connected between the first communication buffer BUF 1 and the third communication buffer BUF 3 and enabled at a different edge from the edge of the clock signal from the system clock generator which enables the third communication buffer BUF 3 for receiving data from the first communication buffer BUF 1 to temporarily store or outputting the stored data to the first communication buffer BUF 1.

Said data are for example binary data having 5 bytes as data amount and can be stored in storage regions of designated addresses of the first to third communication buffers BUF1~3 one byte by one byte. The storage regions of the first to third communication buffers BUF1~3 can be provided with each flip flop. In case that the storage regions of the first to third communication buffers BUF1~3 are provided with flip flops, flip flops of the first communication buffer BUF 1 are enabled by a communication clock generator (not shown) which generates a communication clock signal whenever data informing a start of data transmission among data received from the serial communication device 600 or the central processing unit 700 are detected. Also, the respective flip flops of the second communication buffer BUF 2 are simultaneously enabled at the rising edge of the clock signal from the system clock generator 1000, thereby receiving data from the first communication buffer BUF 1 parallel or outputting the stored data to the first communication buffer BUF 1 parallel. Besides, the flip flops of the third communication buffer BUF 3 are simultaneously enabled at the falling edge of the clock signal from the system clock generator 1000, thereby receiving data from the second communication buffer BUF 2 parallel or outputting the stored data to the second communication buffer BUF 2 parallel. In case that the respective flip flops of the second communication buffer BUF 2 are simultaneously enabled at the falling edge of the clock signal, the flip flops of the third communication buffer BUF 3 are provided to be simultaneously enabled at the rising edge of the clock signal.

Operations of the communication device using the three-step communication buffers according to the first embodiment of the present invention will be explained.

First, in case that data are received from another communication device, operations of the communication device using the three-step communication buffers according to the first embodiment of the present invention will be explained. Herein, said another communication device can be a communication device which communicates with a communication device of the present invention by being constructed equally to that of the first embodiment of the present invention or can be another communication device which communicates data with a communication device of the present invention.

When the serial communication device 600 starts to receive the data from another communication device, the received data are sequentially stored in the first communication buffer BUF 1 from the serial communication device 600 one byte by one byte. More specifically speaking, for example, data of 5 bytes are received, the data are respectively stored in flip flops of 00, 01, 02, 03, 04, and 05 addresses in the first communication buffer BUF 1 one byte by one byte. Then, when the clock signal from the system clock generator 1000 inputted to the second communication buffer BUF 2 is a falling edge, the second communication buffer BUF 2 is enabled to simultaneously receive the data of 5 bytes parallel from the first communication buffer BUF 1. That is, the received data stored in the flip flops of 00, 01, 02, 03, 04, and 05 addresses in the first communication buffer BUF 1 one byte by one byte are simultaneously outputted to flip flops of 00, 01, 02, 03, 04, and 05 addresses in the second communication buffer BUF 2 parallel and temporarily stored.

Subsequently, when the clock signal from the system clock generator 1000 inputted to the third communication buffer BUF 3 is a rising edge, the third communication buffer BUF 3 is enabled to simultaneously receive the data of 5 bytes parallel from the second communication buffer BUF 2. That is, the data respectively stored in the flip flops of 00, 01, 02, 03, 04, and 05 addresses in the second communication buffer BUF 2 one byte by one byte are simultaneously outputted to flip flops of 00, 01, 02, 03, 04, and 05 addresses in the third communication buffer BUF 3 to be stored.

In the meantime, the interrupt generator 900 connected to an output of the serial communication device 600 compares reception data outputted from the serial communication device 600 with data preset and stored by a communication protocol which indicate a transmission completion, thereby checking whether the data reception is completed or not. At this time, in case that the same data with the preset data indicating a transmitting completion exist among the reception data outputted from the serial communication device 600, the reception completion state is recognized and an interrupt signal informing the reception completion state is outputted to the central processing unit 700.

The central processing unit 700 recognizes a new data reception by a reception of the interrupt signal and stops a performing process or completes the performing process according to a predetermined and stored priority. Then, the central processing unit 700 reads data received from the third communication buffer BUF 3 to proceed, thereby completing the reception operation.

In the meantime, in case that the communication device using the three-step communication buffers according to the first embodiment of the present invention transmits data to another communication device, operations thereof will be explained.

First, if the central processing unit 700 writes, that is, outputs, data of 5 bytes to be transmitted to another communication device in the third communication buffer BUF 3, the third communication buffer BUF 3 respectively stores the data of 5 bytes to be transmitted in flip flops of 00, 01, 02, 03, 04, and 05 addresses of the third communication buffer BUF 3 one byte by one byte. Then, when the clock signal from the system clock generator 1000 inputted to the third communication buffer BUF 3 is a rising edge, the third communication buffer BUF 3 is enabled to simultaneously transmit the data of 5 bytes to the second communication buffer BUF 2 parallel. That is, the data respectively stored in the flip flops of 00, 01, 02, 03, 04, and 05 addresses in the third communication buffer BUF 3 one byte by one byte are simultaneously outputted to flip flops of 00, 01, 02, 03, 04, and 05 addresses in the second communication buffer BUF 2 and stored.

Subsequently, when the clock signal from the system clock generator 1000 inputted to the second communication buffer BUF 2 is a falling edge, the second communication buffer BUF 2 is enabled to simultaneously transmit the data of 5 bytes parallel to the first communication buffer BUF 1. That is, the data respectively stored to be transmitted in the flip flops of 00, 01, 02, 03, 04, and 05 addresses in the second communication buffer BUF 2 one byte by one byte are simultaneously outputted to flip flops of 00, 01, 02, 03, 04, and 05 addresses in the first communication buffer BUF 1 and temporarily stored. Finally, the serial communication device 600 reads the data stored in the first communication buffer BUF 1 to be transmitted one byte by one byte and transmits to another destination communication device sequentially, thereby completing a transmission operation.

As aforementioned, in the communication device using the three-step communication buffers according to the first embodiment of the present invention, the accesses for a common buffer are performed at different edges from each other of the clock signal, that is, at another time point, so that incomplete data reading and writing can be prevented without interference. Also, since a pointer showing states of the communication buffers needs not to be always renewed and a pointer which selects a buffer to be accessed needs not to be managed, data can be received or transmitted at a desired time point at all times through a corresponding buffer.

Figure 4:
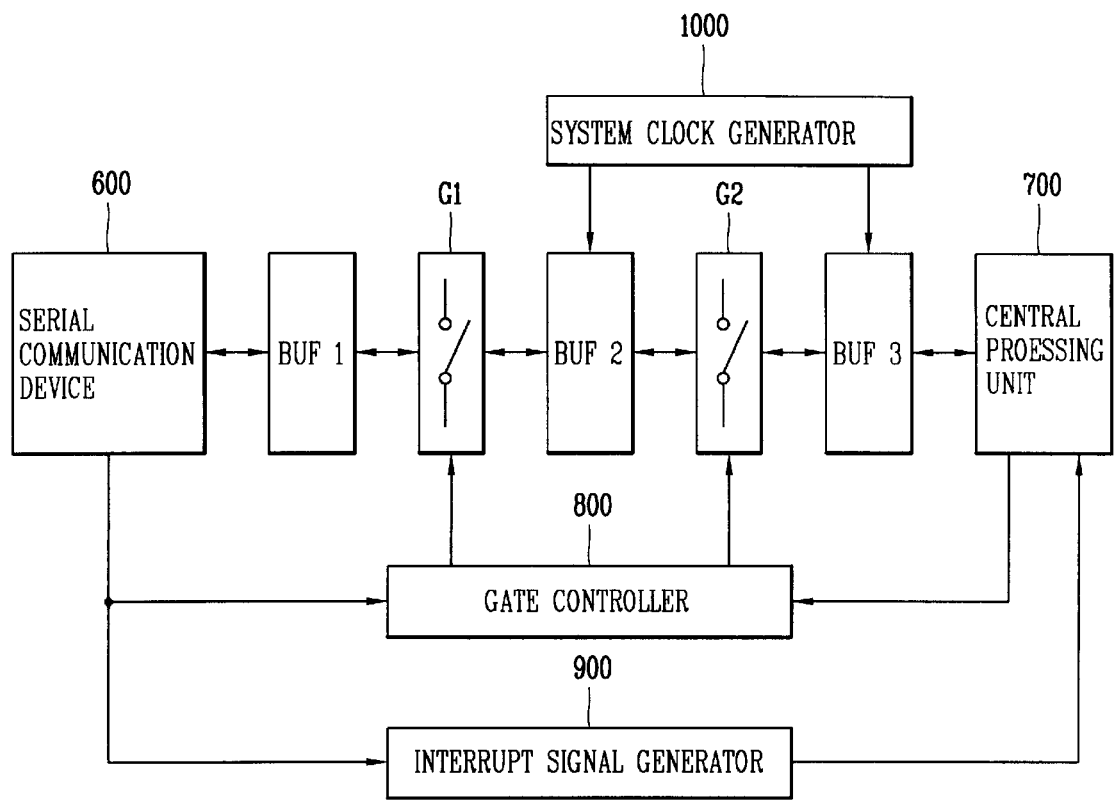
FIG. 4 is a block diagram showing a communication device using three-step communication buffers according to another embodiment of the present invention.

FIG. 4 is a block diagram showing a communication device using three-step communication buffers according to another embodiment of the present invention.

As shown in FIG. 4, the communication device according to another embodiment of the present invention comprises: a serial communication device (Universal Asynchronous Receiver/Transmitter: UART) 600 for receiving data from another communication device or transmitting data from a central processing unit to said another communication device; a central processing unit 700 for reading data received from the serial communication device to process or providing the serial communication device 600 with data to be transmitted to another communication device; an interrupt generator 900 for generating an interrupt signal and outputting to the central processing unit 700 when the serial communication device completes to receive the data; a system clock generator 1000 for generating a clock signal for synchronizing the communication device; a first communication buffer BUF 1 connected to the serial communication device 600 for temporarily storing data received from the serial communication device 600 or temporarily storing data to be transmitted to said another communication device from the central processing unit 700 and for providing to the serial communication device 600; a third communication buffer BUF 3 enabled at a rising edge or a falling edge of the clock signal from the system clock generator 1000 for receiving data to temporarily store or outputting the stored data; a second communication buffer BUF 2 connected between the first communication buffer BUF 1 and the third communication buffer BUF 3 and enabled at a different edge from the edge of the clock signal from the system clock generator which enables the third communication buffer BUF 3 for receiving data from the first communication buffer BUF 1 to temporarily store or outputting the stored data to the first communication buffer BUF 1; a first gate G1 connected between the first communication buffer BUF 1 and the second communication buffer BUF 2 for allowing or blocking a transmission from the first communication buffer BUF 1 to the second communication buffer BUF 2 or from the second communication buffer BUF 2 to the first communication buffer BUF 1; a second gate G2 connected between the second communication buffer BUF 2 and the third communication buffer BUF 3 for allowing or blocking a transmittance from the second communication buffer BUF 2 to the third communication buffer BUF 3 or from the third communication buffer BUF 3 to the second communication buffer BUF 2; and a gate controller 800 for outputting a first instructing signal which instructs the data to be transmitted to the second gate G2 by responding to an instructing signal from the central processing unit 700 or for outputting a second instructing signal which instructs data to be transmitted to the first gate G1 when data indicating a transmission completion are received from the serial communication device 600 or the central processing unit 700. Herein, the first gate G1 allows data to be transmitted when the second instructing signal is received from the gate controller 800, and the second gate G2 allows data to be transmitted when the first instructing signal is received from the gate controller 800.

Said data are for example binary data having 5 bytes as data amount and can be stored in storage regions of designated addresses of the first to third communication buffers BUF1~3 one byte by one byte. The storage regions of the first to third communication buffers BUF1~3 can be provided with each flip flop enabled by a communication clock signal or the clock signal from the system clock generator 1000.

The first gate G1 can be provided with a pair of receiving and transmitting AND gates connected to each other parallel and having different directions of an input and an output. At this time, one input terminal of the receiving AND gate is connected to an output port of the second instructing signal of the gate controller 800, the other input terminal is connected to the first communication buffer BUF 1, and an output terminal is connected to the second communication buffer BUF 2. One input terminal of the transmitting AND gate is connected to an output port of the second instructing signal of the gate controller 800, the other input terminal is connected to the second communication buffer BUF 2, and an output terminal is connected to the first communication buffer BUF 1.

The second gate G2, like the first gate G2, can be provided with a pair of receiving and transmitting AND gates connected to each other parallel and having different directions of an input and an output. At this time, one input terminal of the receiving AND gate is connected to an output port of the first instructing signal of the gate controller 800, the other input terminal is connected to the second communication buffer BUF 2, and an output terminal is connected to the third communication buffer BUF 3. One input terminal of the transmitting AND gate is connected to an output port of the first instructing signal of the gate controller 800, the other input terminal is connected to the third communication buffer BUF 3, and an output terminal is connected to the second communication buffer BUF 2.

The gate controller 800 can be provided with a simple instructing buffer which outputs a binary signal to the first and second gates G1 and G2 whenever the binary "1" corresponding to a signal from the central processing unit 700 instructing a data transmission of the first and second gates G1 and G2 is received.

Operations of the communication device using the three-step communication buffers according to another embodiment of the present invention will be explained.

First, in case that data are received from another communication device, operations of the communication device using the three-step communication buffers according to another embodiment of the present invention will be explained.

When the serial communication device 600 starts to receive the data from another communication device, the received data are sequentially stored in the first communication buffer BUF 1 from the serial communication device 600 one byte by one byte. More specifically speaking, for example, data of 5 bytes are received, the data are respectively stored in flip flops of 00, 01, 02, 03, 04, and 05 addresses in the first communication buffer BUF 1 one byte by one byte. At this time, the gate controller 800 is connected to the serial communication device 600 to compare data indicating a transmission completion among data received by the serial communication device 600 with reference data indicating a transmission completion by a preset communication protocol. Herein, if the data is consistent with the reference data, the gate controller 800 recognizes that the data reception is completed, thereby outputting the second instructing signal to the first gate G1, for example, a binary "1" signal which instructs data to be transmitted. Then, when the clock signal from the system clock generator 1000 inputted to the second communication buffer BUF 2 is a falling edge, the second communication buffer BUF 2 is enabled to simultaneously receive the data of 5 bytes parallel from the first communication buffer BUF 1. That is, the received data stored in the flip flops of 00, 01, 02, 03, 04, and 05 addresses in the first communication buffer BUF 1 one byte by one byte are simultaneously outputted to flip flops of 00, 01, 02, 03, 04, and 05 addresses in the second communication buffer BUF 2 parallel and temporarily stored.

Then, when the central processing unit 700 outputs the instructing signal to the gate controller 800 in order to read the received data, the gate controller 800 responds to the instructing signal to output the first instructing signal, for example, the binary "1" signal, to the second gate G2, and the second gate G2, that is, the receiving AND gate becomes a state for allowing a data transmission.

Subsequently, when the clock signal from the system clock generator 1000 inputted to the third communication buffer BUF 3 is a rising edge, the third communication buffer BUF 3 is enabled to simultaneously receive the data of 5 bytes parallel from the second communication buffer BUF 2 through the receiving AND gate of the second gate G2. That is, the data respectively stored in the flip flops of 01, 02, 03, 04, and 05 addresses in the second communication buffer BUF 2 one byte by one byte are simultaneously outputted to flip flops of 01, 02, 03, 04, and 05 addresses in the third communication buffer BUF 3 to be stored.

In the meantime, the interrupt generator 900 connected to an output of the serial communication device 600 compares reception data outputted from the serial communication device 600 with data preset and stored by a communication protocol which indicates a transmitting completion, thereby checking whether the data reception is completed or not. At this time, in case that the same data with the preset data indicating a transmission completion exist among the reception data outputted from the serial communication device 600, the reception completion state is recognized and an interrupt signal informing the reception completion state is outputted to the central processing unit 700.

The central processing unit 700 recognizes a new data reception by a reception of the interrupt signal and stops a performing process or completes the performing process by a preset priority. Then, the central processing unit 700 outputs the instructing signal to the gate controller 800 and reads data received from the third communication buffer BUF 3 to proceed, thereby completing the reception operation.

In the meantime, in case that the communication device using the three-step communication buffers according to the first embodiment of the present invention transmits data to another communication device, operations thereof will be explained.

First, if the central processing unit 700 writes, that is, outputs, data of 5 bytes to be transmitted to another communication device in the third communication buffer BUF 3, the third communication buffer BUF 3 respectively stores the data of 5 bytes to be transmitted in flip flops of 01, 02, 03, 04, and 05 addresses of the third communication buffer BUF 3 one byte by one byte.

Then, when data of 5 bytes to be transmitted are completed to be transmitted to the third communication buffer BUF 3, the central processing unit 700 outputs an instructing signal to the gate controller 800. The gate controller 800 responds to the instructing signal to output first and second instructing signals to the second gate G2 and the first gate G1 respectively, so that the second gate G2 and the first gate G1 are controlled as a state to allow a data transmission.

Then, when the clock signal from the system clock generator 1000 inputted to the third communication buffer BUF 3 is a rising edge, the third communication buffer BUF 3 is enabled to simultaneously transmit the data of 5 bytes to the second communication buffer BUF 2 parallel through the second gate G2. That is, the data respectively stored in the flip flops of 01, 02, 03, 04, and 05 addresses in the third communication buffer BUF 3 one byte by one byte are simultaneously outputted to flip flops of 01, 02, 03, 04, and 05 addresses in the second communication buffer BUF 2 and stored.

Subsequently, when the clock signal from the system clock generator 1000 inputted to the second communication buffer BUF 2 is a falling edge, the second communication buffer BUF 2 is enabled to simultaneously transmit the data of 5 bytes parallel to the first communication buffer BUF 1. That is, the data respectively stored to be transmitted in the flip flops of 01, 02, 03, 04, and 05 addresses in the second communication buffer BUF 2 one byte by one byte are simultaneously outputted to flip flops of 01, 02, 03, 04, and 05 addresses in the first communication buffer BUF 1 and temporarily stored.

Finally, the serial communication device 600 reads the data stored in the first communication buffer BUF 1 to be transmitted one byte by one byte and transmits to another destination communication device sequentially, thereby completing a transmission operation.

As aforementioned, in the communication device using the three-step communication buffers according to another embodiment of the present invention, an access is allowed at a time point when complete receiving data or transmitting data are stored in the communication buffer at the time of transmitting and receiving, thereby improving a communication reliability than the first embodiment of the present invention.

As still another embodiment of the present invention, it is possible to construct data to be transmitted to a next communication buffer automatically if data are written to a specific address or a last address without using the gate controller 800. That is, if data are written to a specific address or a last address of the first communication buffer at the time of receiving data, the data are automatically transmitted to the second communication buffer, thereby preventing an error generated by interference between the central processing unit 700 and the serial communication device 600.

As still another embodiment of the present invention, it is also possible to construct incomplete data to be transmitted by accessing to a time delay circuit between the system clock generator 1000 and the second communication buffer BUF 2 or between the system clock generator 1000 and the third communication buffer BUF 3 and thereby generating time difference at the time when the first communication buffer BUF 1 and the third communication buffer BUF 3 access to the second communication buffer BUF 2 respectively.

As still another embodiment of the present invention, by using a dual port random access memory instead of the second communication buffer BUF 2, it is also possible to access thereto from both directions of the serial communication device and the central processing unit, in which a simultaneously access is not possible.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A communication device using three-step communication buffers comprising:
   a serial communication device for receiving data from another communication device or transmitting data to said another communication device;
   a central processing unit for reading data received from the serial communication device or providing the serial communication device with data to be transmitted to another communication device;
   an interrupt generator for generating an interrupt signal and outputting to the central processing unit when the serial communication device completes to receive the data;
   a system clock generator for generating a clock signal for synchronizing the communication device;
   a first communication buffer connected to the serial communication device for temporarily storing data received from the serial communication device or temporarily storing data to be transmitted to said another communication device from the central processing unit and for providing to the serial communication device;
   a third communication buffer enabled at a rising edge or a falling edge of the clock signal from the system clock generator for receiving data to temporarily store or outputting the stored data; and
   a second communication buffer connected between the first communication buffer and the third communication buffer and enabled at a different edge from the edge of the clock signal which enables the third communication buffer for receiving data from the first communication buffer to temporarily store or outputting the stored data to the first communication buffer.

2. The device of claim 1 further comprising:
   a gate means connected between the second communication buffer and the third communication buffer for allowing or blocking a data transmission from the second communication buffer to the third communication buffer or from the third communication buffer to the second communication buffer; and
   a gate controller for responding to an instructing signal from the central processing unit and for outputting an instructing signal which instructs a data transmission allowance to the gate means.

3. The device of claim 2, wherein the gate means is an AND gate comprising:
   one input terminal for inputting data;
   the other input terminal for inputting an instructing signal from the gate controller; and
   an output terminal for outputting data.

4. The device of claim 2, wherein the gate controller is a buffer for outputting an instructing signal from the central processing unit to the gate means.

5. The device of claim 1 further comprising:
   a first gate means connected between the first communication buffer and the second communication buffer for allowing or blocking a transmittance from the first communication buffer to the second communication buffer or from the second communication buffer to the first communication buffer;
   a second gate means connected between the second communication buffer and the third communication buffer for allowing or blocking a transmission from the second communication buffer to the third communication buffer or from the third communication buffer to the second communication buffer; and
   a gate controller for outputting a first instructing signal which instructs the data transmission allowance to the second gate means by responding to an instructing signal from the central processing unit or for outputting a second instructing signal which instructs data transmission allowance to the first gate means when data indicating a transmission completion are received from the serial communication device or the central processing unit.

6. The device of claim 1, wherein the second communication buffer and the third communication buffer respectively enabled by depending on an edge of a clock signal from the system clock generator are a plurality of flip flops which receive data to temporarily store or output the stored data.

7. The device of claim 1, wherein the second communication buffer is a dual port random access memory to which access is possible from both directions of the serial communication device and the central processing unit, in which a simultaneous access is not possible.

8. The device of claim 1 further comprising:
   a time delay circuit connected between the system clock generator and the second communication buffer or between the system clock generator and the third communication buffer for generating time difference when the first communication buffer and the third communication buffer BUF 3 respectively access to the second communication buffer.

* * * * *